United States Patent [19]

Swenson

[11] Patent Number: 4,613,804
[45] Date of Patent: Sep. 23, 1986

[54] FLOOR POSITION SENSING APPARATUS AND METHOD

[75] Inventor: Ronald R. Swenson, Salt Lake City, Utah

[73] Assignee: Eaton-Kenway, Inc., Salt Lake City, Utah

[21] Appl. No.: 752,865

[22] Filed: Jul. 8, 1985

[51] Int. Cl.$^4$ .............................................. G05D 1/00
[52] U.S. Cl. ..................................... 318/587; 180/168; 104/88
[58] Field of Search ............... 318/587; 180/168, 169; 104/88; 364/424

[56] References Cited

U.S. PATENT DOCUMENTS

| | | | |
|---|---|---|---|
| 3,556,244 | 1/1971 | Gray | 318/587 X |
| 3,628,624 | 12/1971 | Wesher | 180/168 |
| 3,757,887 | 9/1973 | Moore et al. | 180/168 |
| 4,088,939 | 5/1978 | Mitschke et al. | 180/168 X |
| 4,361,202 | 11/1982 | Minovitch | 104/88 |

*Primary Examiner*—B. Dobeck
*Attorney, Agent, or Firm*—Lynn G. Foster

[57] ABSTRACT

Apparatus and method by which an unmanned, trackless, work-producing vehicle is able to follow a path defined by a passive metallic marker or markers or by which the vehicle can receive information represented by passive metallic markers. Metallic markers can be secured or applied to appropriate surfaces, such as the floor surface of a vehicle work area, and do not need to be connected to any signal-generating device.

An alternating magnetic field is generated by a master coil carried on the vehicle. The alternating magnetic field produces a secondary field around the metallic marker. Both magnetic fields produce voltages in a plurality of spaced secondary coils located on the vehicle. The existence of the metallic marker as a bench mark is identified by comparing the phases of voltages produced by the primary and secondary fields in each separate secondary coil. This excludes any stray fields, which may be extraneously produced in the secondary coils. The location of the marker with respect to the vehicle is determined by comparing the magnitude of the voltages produced in the plurality of secondary coils.

26 Claims, 8 Drawing Figures

FLOOR POSITION SENSING APPARATUS AND METHOD

FIELD OF INVENTION

This invention relates generally to guidance control systems for a trackless unmanned vehicle using position defining media, such as at least one metalic strip to define certain positions, which media or strip is detected by magnetic fields generated on the trackless vehicle itself.

Prior Art

It is known to guide at least one and, normally several steerable, trackless unmanned vehicles by embedding electrical conductors in a surface, for example, in a factory floor whereby the conductors define the paths available to the vehicles. An alternating current is selectively passed through the conductors. A magnetic field is formed around one conductor, for example, which is sensed by coils located on a vehicle via inducing voltages in the coils. These voltages are representative of the respective distance of the coils from the conductor, thus defining the position of the vehicle with respect to the conductors. Using a digital computer or other form of signal processor, trigonometric functions represented by the signals are solved to determine the position of the vehicle with respect to the conductor. The processed signals are applied as positioning signals to steering mechanisms of the vehicle, which cause the vehicle to follow the buried, magnetic field generating conductor.

In general, however, the guidance cable must be buried in the floor of an installation at considerable cost and inconvenience. Since these floors are generally of concrete, considerable time is necessary to accomplish such an installation either initially or on a retrofit basis. Moreover, during operation of such prior art systems, substantial quantities of dust and debris are often produced, which produce inaccuracies and may be damaging to the installation.

In addition, prior art systems, using a plurality of current carrying guide wires or permanent magnets embedded in a floor, are very difficult to change or modify to meet changing conditions or new requirements or to accommodate improvements thereto.

It has also been known in the prior art to follow a field-generating conductor by using two coils located at a predetermined position on a vehicle in mutually orthogonal positions, one coil having a vertical axis and one coil having a horizontal axis. See German Disclosure document DE-OS No. 2328 863 and Erich Rubel, U.S. Pat. No. 4,258,813. The orientation of the coils with respect to each other and with respect to the field generating cable produces outputs from which the horizontal deviation or deflection of the vehicle from the path defined by the cable can be determined. Such a system is disclosed in Eberhard Schnaibel, U.S. Pat. No. 4,247,896, wherein the output of two mutually orthogonal coils is sensed for a null value for a horizontal coil and a maximum value for a vertical coil. By timing the interval between the occurence of the aforementioned events, an output suitable for direct processing by a digital computer can be obtained. Since such mutually orthogonal coils sense null and maximum values, they are particularly susceptible to variations in the magnetic field produced around the conductor. Bends and corners in cables or the intersection of one or more cables produce variations in the magnetic fields which can be misinterpreted, resulting in guidance errors.

It is also known in the Art to deploy a plurality of coils in geometric arrangements in order to minimize certain effects or anomalies produced as a consequence of the interaction of a magentic field generating conductor driven by alternating current. See Charles L. Taylor, U.S. Pat. No. 4,307,329. The use of a plurality of coils in the prior art, however, is directed to the detection of magnetic fields independantly produced by a conductor as a consequence of an alternating electrical current carried by that conductor. The coils do not detect the presense of passive guide markers.

It is also known in the prior art to use permanent magnets embedded in the floor to signal locations or other information to a trackless vehicle using finger switches or other techniques. See mention thereof in Robert DeLiban, U.S. Pat. No. 4,284,106. Magnets have not been used to completely define a path without an electrical conductor such as those mentioned above. Although such magnets do not require an external power source, they are dependant on their magnetic character for their effectiveness. It is impractical to construct a path of permanent magnets since such a path would be expensive, hard to install, and difficult to maintain.

BRIEF SUMMARY AND OBJECTS OF THE INVENTION

The disadvantage of the prior art are overcome or substantially alleviated by the present invention, which in brief summary comprises apparatus and method by which an unmanned, trackless vehicle is able to follow a path defined by a passive metallic marker or markers or by which the vehicle can receive information represented by passive metallic markers. Metallic markers can be secured or applied to appropriate surfaces, such as the floor surface of a vehicle work area, and do not need to be connected to any signal-generating device.

An alternating magnetic field is generated by a master coil carried on the vehicle. The alternating magnetic field produces a secondary field around the metallic marker. Both magnetic fields produce voltages in a plurality of spaced secondary coils located on the vehicle. The existence of the metallic marker as a bench mark is identified by comparing the phases of voltages produced by the primary and secondary fields in each separate secondary coil. This excludes any stray fields, which may be extraneously produced in the secondary coils. The location of the marker with respect to the vehicle is determined by comparing the magnitude of the voltages produced in the plurality of secondary coils.

Accordingly, it is a primary object of the present invention to overcome or alleviate problems of the prior art in respect to control systems for trackless unmanned work-producing vehicles.

It is a further important object of the present invention to provide for vehicle sensing of a metallic marker, which serves as a bench mark for an unmanned trackless work-producing vehicle.

It is a further significant object of the invention to discriminate, in the control of unmanned trackless work-producing vehicles, against irrelevant ferromagnetic substances, such as concrete rebar, which are commonly associated with a work area for such vehicles.

Another paramount object of this invention is to eliminate the need for a continuous, electricity-carrying guide wire in a trackless vehicle system.

It is further dominant object of this invention to provide for a guide path system for trackless vehicles which is easily installed, maintained and altered from time-to-time.

It is an additional important object of the invention to provide a trackless vehicle guidance system in which all sensing devices requiring power are carried on the vehicle.

It is another significant object of the invention to provide a sensing capability which distinguishes between ferromagnetic and non-ferromagnetic materials.

It is another paramount object to provide a control guidance system by which a trackless unmanned work-producing vehicle first discriminates between a metallic bench mark of the system and other metallic objects, and, thereafter, identifies the location of the vehicle with respect to the metallic bench mark.

These and other objects and features of the present invention will be apparent from the detailed description taken with reference to the accompanying drawings.

DETAILED DESCRIPTION OF THE ILLUSTRATED EMBODIMENT

Figure 1:
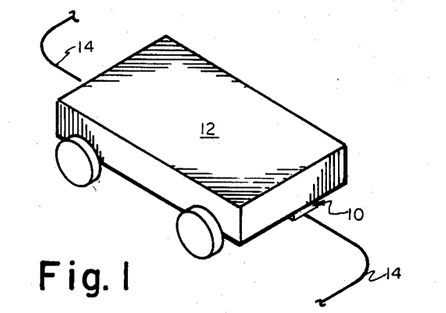
FIG. 1 is a three dimensional schematic of a vehicle having primary and secondary coil in accordance with the present invention.

Reference is now made to the drawings, which illustrate a presently preferred embodiment of the invention and wherein like numerals are used to designate like parts throughout. In FIG. 1, a sensor 10 is carried by a vehicle 12 whereby the vehicle is able to follow a guide path or marker 14. The guide path or marker 14 may comprise an aluminum strip, or other suitable metallic markers, as more fully set forth below. The marker 14 may be continuous, but need not be. The marker 14 may also comprise position indicators or flags.

Figure 2:
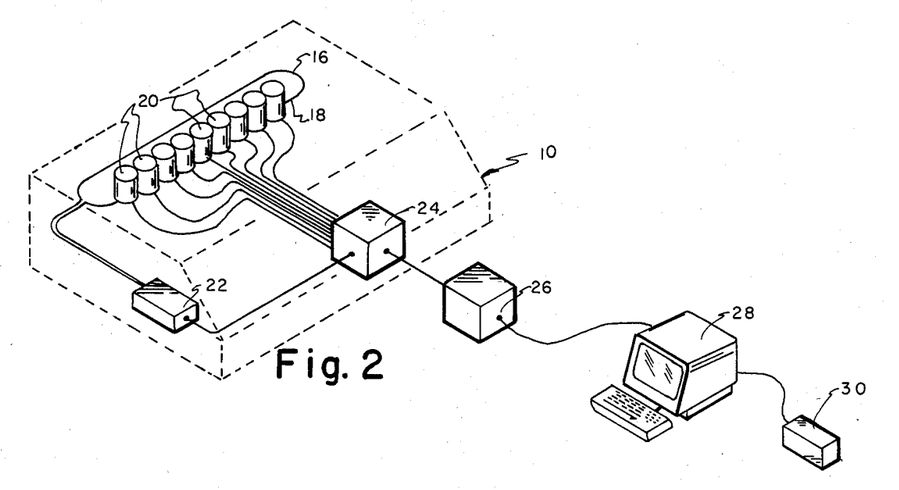
FIG. 2 is a three dimensional schematic showing the relationship between the primary and secondary coils and related circuitry and the signal processing devices, all carried on the vehicle.

The sensor 10, as shown in FIG. 2, comprises a transmit antenna coil 16, a plurality of pick-up coils 20, an oscillator 22 and a floor position sensor circuit 24, for sampling the outputs of the pick-up coils 20.

The primary transmit antenna coil 16 comprises a plurality of turns of magnet wire, for example 20 turns of 26 AWG magnet wire. The transmit antenna coil 16 may have a generally rectangular shape approximately 10 inches by 2½ inches, but numerous other shapes are possible. The design of the transmit antenna coil 16, however, must provide for at least one plane where the lines of magnetic flux are in opposite directions on either side of that plane in the vicinity of the transmit antenna coil 16. In the preferred embodiment, one side 18 of the transmit antenna coil 16 provides such an embodiment.

Figure 3:
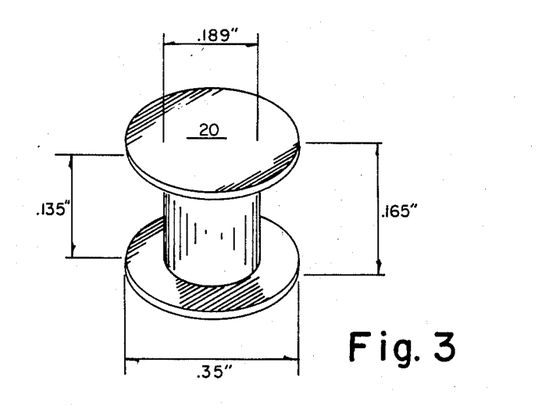
FIG. 3 dimensionally illustrates in persepective a suitable secondary coil.

A plurality of secondary spaced pick-up coils 20 are also provided. The pick-up coils 20 are designed so that, when they are placed in an alternating magnetic field, an electrical current will be produced in each pick-up coil 20. A plurality of designs are possible for such secondary coils. It is, however, presently preferred that each pick-up coil 20 comprise a plurality of turns of magnet wire, for example 200 turns of 36 AWG magnet wire, wrapped around a suitable bobbin. The presently preferred dimensions of such a bobbin are shown in FIG. 3. The dimensions shown in FIG. 3 are not critical to the invention, and one skilled in the art will be able to devise other configurations and sizes for use as pick-up coils 20, without departing from the spirit of the invention.

The transmit coil 16 is provided with an alternating electric current from an oscillator 22, which produces a varying magnetic field around the transmit coil 16. The pick-up coils 20 are connected to a floor position sensor circuit 24, the function of which will be more fully described below. The oscillator 22 and the circuit 24 form part of the sensor 10 and are carried by the vehicle 12. The floor position sensor circuit 24 is also provided with an output from the oscillator 22 for purposes of synchronizing the floor position sensor circuit 24 with the operation of the transmit coil 16.

The floor position sensor circuit 24 produces an analog output the amplitude of which is proportional to the voltage produced by the pick-up coils 20. The floor position sensor circuit 24 serially outputs an amplitude signal for each of the plurality of pick-up coils 20. The output of the floor position sensor circuit 24 can be processed in a plurality of known ways. For example, the output of the floor position sensor circuit 24 may be converted from analog-to-digital in an analog-to-digital vehicle-carried converter 26, processed by a vehicle-mounted computer 28 and used to generate commands from the computer to a steering system 30 for the vehicle 12. Alternatively, the output of floor position sensor circuit 24 can be processed in an analog fashion to produce the same result.

The alternating current produced by the oscillator 22 creates an alternating magnetic field surrounding the transmit coil 16. The alternating magnetic field surrounding transmit coil 16 does two things. First, it induces a current in the pick-up coils 20. Second, it induces a magnetic field in the marker 14, which is characteristic of the material of which the marker 14 is made. If the marker 14 comprises ferrous metal, the induced magentic field around the marker 14 is of lower magnitude and generally less than 180° out of phase with the magentic field around the transmit coil 16. If, however, the marker 14 comprises aluminum or other suitable non-ferrous metal, as is presently preferred, the induced magnetic field around the marker 14 is of lower magnitude and generally greater than 180° out of phase from the magnetic field around the transmit coil 16. The degree of phase shift is characteristic of and correlates to the material from which the marker 14 is made.

Figure 4:
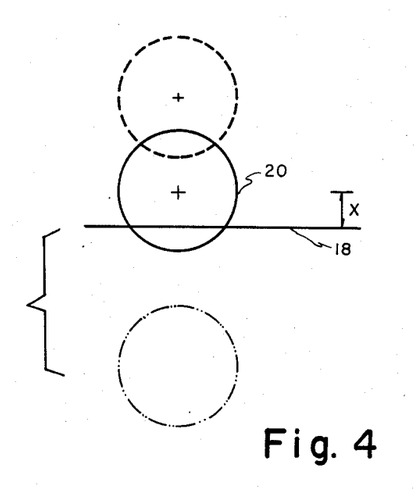
FIG. 4 illustrates possible placement of one secondary coil with respect to a segment of the primary magnetic field-generating coil.
Figure 5:
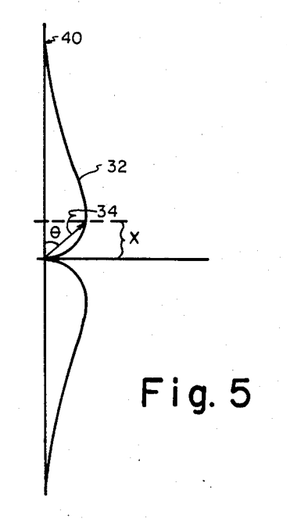
FIG. 5 is a graph illustrating the output of one secondary coil dependant on the position of the coil with respect to the primary magnetic field-generating coil.

Referring now to FIG. 4, the pick-up coils 20 are positioned substantially near a segment 18 of the transmit coil 16. The pick-up coils 20 are oriented and arranged in such a fashion that the magnetic flux on one side of the segment 18 is 180° out of phase with the magnetic flux on the other side of the segment 18. Thus, if the pick-up coil 20 is oriented at a first position entirely on the first side of the segment 18 and a sufficient distance away from segment 18 (such as at the position shown in dotted lines in FIG. 4) the magnetic field around the transmit coil 16 will produce a first voltage of maximum amplitude in the pick-up coil 20. If the pick-up coil 20 is positioned at a second position on the other side of segment 18 (such as at the position shown in phantom lines in FIG. 4), a similar maximum voltage is obtained, but this voltage is 180° out of phase with the mentioned first voltage. If the pick-up coil 20 is moved from the first position to the second position, a phasor diagram can be obtained which represents the magnitude and phase shift of the output voltage of the pick-up coil 20 as a function of the distance from the center of the pick-up coil 20 to the segment 18. The described phase diagram is shown in FIG. 5.

The variable displacement X of the center of the pick-up coil 20 from the transmit antenna 16 is shown. Vector 40 represents the magnitude and phase of the magnetic field produced by the transmit antenna 16, depending on the amount of displacement X. The curve 32 represents the ends of a plurality of vectors 34. The included angle between vector 40 and vector 34 represents a phase shift between the imposed magnetic field and the resulting voltage. The length represents the magnitude of the produced voltage.

By varying the displacement X, the vector 34 can be made to be 180° out of phase with the magnetic field induced in the marker 14 by the magnetic field around the transmit coil 16. The magnetic field induced in the marker 14 produces a voltage in each pick-up coil 20 with an amplitude dependant both on the material from which the marker 14 is comprised and on the distances between the transmit coil 16 and the marker 14, on the one hand, and the pick-up coil 20 and the marker 14, on the other hand.

Figure 6:
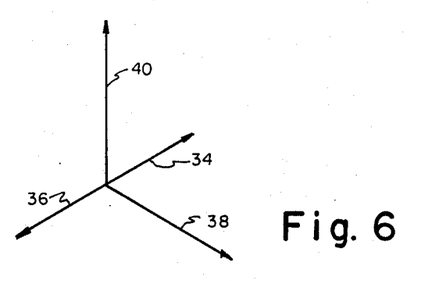
FIG. 6 is a two dimensional vector diagram illustrating the relationship between a plurality of magnetic fields and electrical currents produced in or near a coil.

In FIG. 6, the magnitude and phase of the magnetic field around transmit coil 16 are represented by vector 40. Vector 40 produces a voltage, as described above, in each pick-up coil 20, magnitude and phase of which are represented by vector 34. The induced magnetic field around the marker 14 also produces a voltage in the pick-up coil 20, the magnitude and phase of which, with respect to Vector 40, is shown as vector 36 is FIG. 6. Vectors 34 and 36 are electrically additive as vectors. As a given pick-up coil 20 approaches the strip 14, the magnitude of vector 36 will increase and the sum of vectors 34 and 36 will approach a minimum.

Ferromagnetic materials, such rebar as in the concrete floor of a factory, will also produce an induced magnetic field. Because of the composition of the metals, which are typically used in structures such as factory floors, the magnetic fields induced around said metals will have different characteristic phase shifts from that of marker 14. These magnetic fields produce a voltage in each pick-up coil 20 which is generally less than 90° out of phase with vector 34, such as, for example, vector 38 shown in FIG. 6.

The addition of vectors 34 and 38 will produce a resultant voltage which typically has an amplitude greater than either vector 34 or vector 38. The output of each pick-up coil 20, therefore, is a sinusoidal voltage, the phase and amplitude of which are dependant upon the nature of metal substances near the pick-up coil 20 and the distance of the metal from the pick-up coil 20.

The floor position sensor circuit 24, the function of which is more fully described hereinafter, detects the maximum value of the output voltage of each pick-up coil 20 and communicates it to the computer 28. Because the amplitude and phase shift of vector 34 are known, all components not due to vector 34 or vector 36 are eliminated by the computer 28. Since the magnitude of vector 34 is also known, the magnitude of vector 36 can be determined and, as a consequence, the distance from any pick-up coil 20 to the marker 14 can be determined. In the preferred embodiment, a plurality of aligned and spaced pick-up coils 20 are provided, resulting in a plurality of distances from the several pick-up coils 20 to the marker 14. On the basis of the voltage data emanating from each coil 20, the computer 28 can determine the position of the vehicle 12 with respect to the marker 14.

Figure 7:
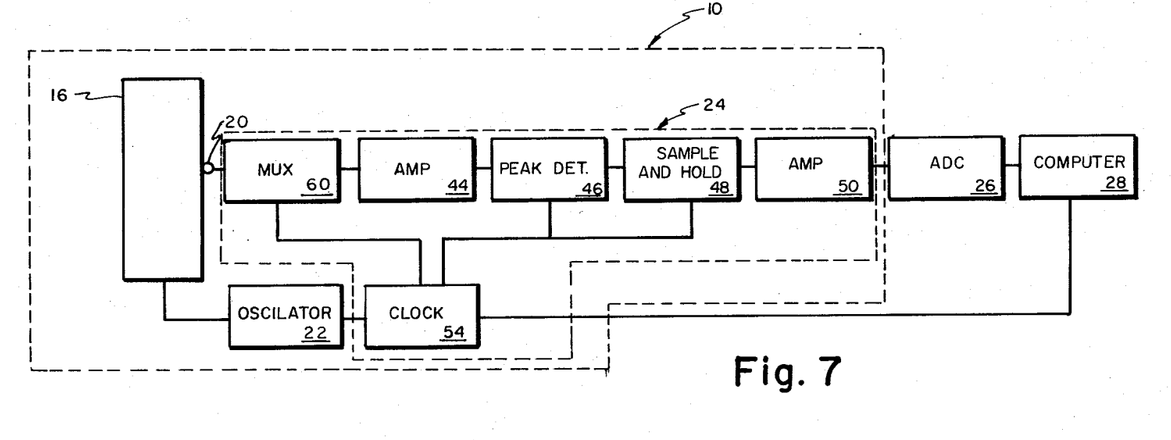
FIG. 7 is a block diagram of a presently preferred embodiment of the invention.

Referring now to FIG. 7, the electrical components of the presently preferred floor position sensor circuit 24 are depicted in block diagram form. The transmit antenna coil 16 is driven by oscillator 22 at a suitable frequency, for example 4500 Hz. The output of the oscillator 22 is also provided to a clock circuit 54, which conventionally provides timing both for the floor position sensor circuit 24 and for the computer 28 so that all functions are synchronized. The clock circuit 54 drives a multiplexer 60, which samples among a plurality of pick-up coils 20 located generally along a line perpendicular to the axis of the vehicle 12. The outputs of the coils 20, as sampled by the multiplexer 60, are amplified by an amplifier circuit 44. The maximum output value of each coil 20 is determined by peak detector 46. The output of the peak detector for each coil 20 is thence communicated to a sample and hold circuit 48, so that a series of maxima is obtained. The series of maxima is communicated to an amplifier 50 and thence through an analog-to-digital converter 26 to computer 28 for further processing.

Figure 8:
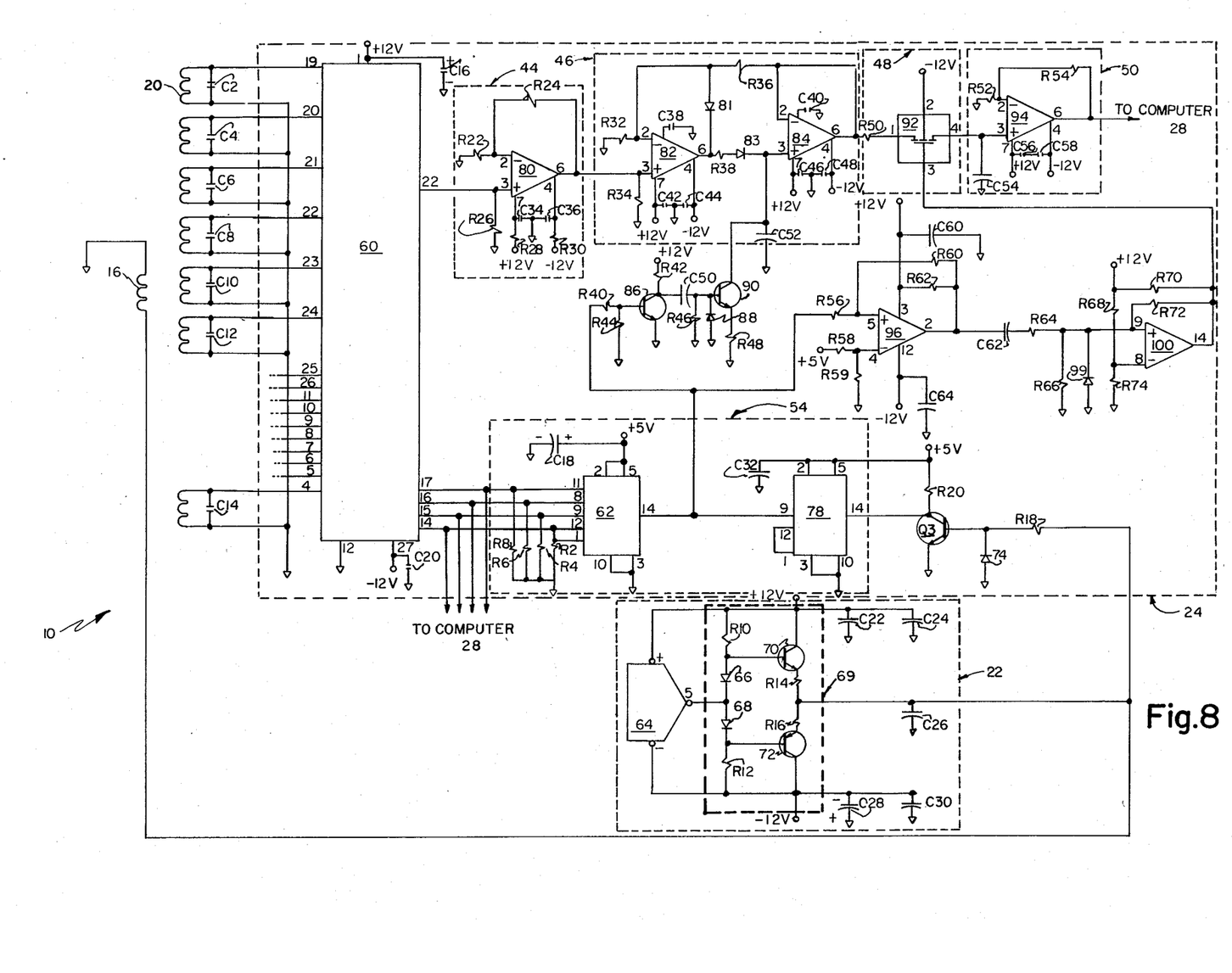
FIG. 8 is a detailed circuit diagram of the embodiment of FIG. 7.

Reference is now made to FIG. 8, which illustrates a presently preferred circuit diagram corresponding to the block diagram of FIG. 7. In FIG. 8, standard pin numbers for conventional integrated circuits are shown without lead lines. Oscillator chip 64 is illustrated as being a sign wave oscillator, such as a 4023/25 available from Burr Brown. In the exemplary embodiment, the oscillator chip 64 is chosen to produce a 4.5 KHz sine wave. The output of the oscillator 64 is input to a push-pull amplifier 69 comprising two transistors 70 and 72. Transistor 70 is a TIP29 and transistor 72 is a TIP30. The transistors 70 and 72 are provided with resistors R10, R12, R14 and R16 and diodes 66 and 68 (which are preferably 1N4148 diodes). The collectors of transistors 70 and 72 are respectively provided with voltage sources of equal magnitude but opposite polarity. The collectors are also grounded through capacitors C22, C24, C28 and C30 to filter the output within suitable tolerances.

The output of push-pull amplifier 69 is connected to the transmit antenna coil 16 and to the clock circuit 54. One lead of the transmit antenna coil 16 is connected to ground through capacitor C26, which is used to tune the transmit antenna coil 16 and is connected between the output of the push-pull amplifier 69 and ground and, therefore, across the two leads of the transmit antenna coil 16.

The output of the push-pull amplifier 69 is also connected to a clock circuit 54 through a resistor R18. Resistor R18 provides a relatively large impedance so that most of the power produced by the push-pull amplifier 69 is directed through the transmit antenna coil 16. The sine wave is rectified through diode 74 and the resulting half-wave is amplified by transistor 76, such as 2N2222A. The collector of the transistor 76 is provided with a 5 volt power supply through resistor R20. The amplified output of the transistor 76 is input to integrated circuit 78, which is a divide-by-four circuit, such as 74LS93, available from Texas Instruments.

The output of integrated circuit 78 is a clock signal, which is one-fourth as fast as the frequency of the sine wave produced by oscillator 64. The clock signal is used to drive the multiplexer 60 and to control the peak detector circuit 46 and the sample and hold circuit 48, as more fully described below. To control the multiplexer 60, the output of the integrated circuit 78 is input to a four bit counter 62, such as a 74LS93 integrated circuit. Four bit counter 62 is connected to ground through a capacitor C18 and to a voltage source in accordance with the prior art. The output of the four bit counter 62 is provided with resistors R2, R4, R6 and R8, to increase operational efficiency. The output of the four bit counter 62 is connected both to the multiplexer 60 and to the computer 28 for synchronization.

The multiplexer 60, such as MUX16 available from Precision Monolithics, Inc., samples the outputs of the plurality of pick-up coils 20. Each pick-up coil 20 is provided with a tuning capacitor, such as capacitors C2, C4, C6, C8, C10, C12 and C14 across the leads of the respective pick-up coils 20. One lead of each pick-up coil is connected to the multiplexer 60 and the other lead is connected to ground. The multiplexer 60 is also provided with voltage sources which are grounded for filtering purposes through capacitors C16 and C20.

The output of the multiplexer is connected to an amplifier 80, which may be an integrated circuit, such as an HA2525 available from Harris Semiconductor, past a resistor R26. Resistor R26 provides a termination impedance for the multiplexer 60 (MUX16), at a low enough value to provide high attenuation when a multiplexer channel is off and high enough not to load down the output drive of the multiplexer. The amplifier 80 is provided with appropriate biasing and voltages through resistors R22, R24, R28 and R30 and capacitors C34 and C36. Integrated circuits 82 and 84 comprise peak detector 46. The integrated circuits 82 and 84 may comprise HA2525 units available from Harris Semiconductor. Resistor R34 provides a constant finite impedance for the output of amplifer 80, and resistors R32, R36 and R38 and capacitors C38, C42, C44, C40, C46 and C48 and diodes 81 and 83 (1N4148 diodes) provide appropriate biasing.

A signal from the clock 54 is provided to the peak detector 46 through two stages of amplification. Resistor R40 provides a substantial impedance to the clock signal so that most of the power of the clock signal is directed to the multiplexer 60 mentioned above. Resistor R44 is used to remove excess base stored charge to turn transistor 86 off rapidly. The combination of resistors R40 and R44 limits the base drive current of transistor 86. Transistor 86, such as 2N2222A, is an amplifying stage provided with a voltage source through resistor R42. Capacitor C50, diode 88 (a 1N4148 diode) and resistor R46 form a unipolar differentiation circuit to drive transistor 90. Capacitor C52 is used to store the peak value of the peak detector section 46. Transistor 90 such as a 2N2222A is used in conjunction with its drive circuitry waveform to discharge capacitor C52 during multiplexer channel switching.

The output of the peak detector 46 is connected to an integrated sample and hold circuit 92, which is preferably an SD5000 available from Siliconix, through a relatively low impedance resistor R50. Resistor R50 serves to current limit the output of integrated circuit 84 when circuit 92 is turned on and capacitor C54 is then seen by the output of circuit 84. The sample and hold circuit 92 is provided with an input from the clock. In the exemplary embodiment, two comparators are shown comprising integrated circuits 96 and 100, which are preferably LM339 integrated circuits available from National Semiconductor. The integrated circuits 96 and 100 are provided with resistors and capacitors, as is conventional. These comprise resistors R58, R59, R60, R62, R64, R66, R68, R70, R72 and R74 and capacitors C60, C62 and C64 and diode 98, such a 1N4148 diode. Capacitors C62, resistors R64 and R66 and diode 99, along with resistors R68 and R74 (comparator reference) form a differential circuit to produce a unipolar pulse to operate the sample and hold circuit.

The output of the integrated sample and hold circuit 92 is amplified through amplifier 94 which may be a suitable integrated circuit, such as an HA2525 available from Harris Semiconductor. Amplifier 94 is provided with appropriate biasing resistors R52 and R54 and capacitors C56 and C58. Capacitor C54 is a sample and hold holding capacitor. The output of the amplifier 94 then is communicated to the previously mentioned analog-to-digital converter 26, which is not shown on FIG. 8. The output of the analog digital converter 26 is processed by computer 28, as more fully described above.

The foregoing description of the circuit shown in FIG. 8 is based upon availability of appropriate voltage sources at appropriate levels, such as, for example, +12 volts, −12 volts, +5 volts and −5 volts. Such voltage sources may be provided with suitable capacitors for filtering noise and other unwanted frequencies as is well known.

The values of the components are not critical to the operation of the invention. Obviously, numerous variations and modificications may be made without departing from the present invention.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A guidance system for guiding at least one unmanned trackless work-producing vehicle, the system comprising:
   at least one unmanned trackless work-producing vehicle;
   metallic bench mark means separate from said vehicle;
   sensor means carried on the vehicle, the sensor means comprising means by which a plurality of magnetic fields are selectively generated, one of said magnetic field being around said metallic bench mark means, means producing a composite voltage proportional to the summation of the plurality of magnetic fields and means periodically sampling said composite voltage, said sampling means being in electrical communication with said composite voltage producing means; and control means in electrical communication with the sensor means receiving and analyzing each sampled composite voltage and controlling the displacement of the vehicle based on said analysis.

2. A system according to claim 1 wherein the composite voltage producing means comprise means located asymmetrically across a boundary between areas of opposite magnetic fields produced by said magnetic field generating means.

3. A system according to claim 1 wherein said magnetic field generating means further comprise:
means producing an alternating current;
coil means converting said alternating current into a magnetic field in electrical communication with said alternating current producing means.

4. A system according to claim 1 wherein the composite voltage producing means further comprise a plurality of spaced voltage producing means.

5. A guidance system for guiding at least one unmanned trackless work-producing vehicle, the system comprising:
at least on unmanned trackless work-producing vehicle;
metallic bench mark means;
sensor means carried on the vehicle, the sensor means comprising magnetic field generating means, means producing a composite voltage proportional to a plurality of magnetic fields, the composite voltage producing means further comprising a plurality of spaced voltage producing means, and means periodically sampling said composite voltage, said sampling means being in electrical communication with said composite voltage producing means; and, the sampling means comprising means identifying a maximum voltage for each of the spaced voltage producing means,
control means receiving and analyzing each sampled composite voltage and controlling the displacement of the vehicle based on said analysis in electrical communication with the sensor means, the control means comprising means in electrical communication with said identifying means comparing said maximum voltages, and means in electrical communication with said comparing means determining the location of said metallic bench mark means with respect to said spaced voltage producing means.

6. A system according to claim 5 wherein the metallic bench mark means further comprise a non-ferromagnetic material and wherein the control means comprises means in electrical communication with the identifying means and the comparing means discriminating between the non-ferromagnetic bench mark means and ferromagnetic materials.

7. A system according to claim 6 wherein said nonferromagnetic bench mark means comprise an aluminum material.

8. A system according to claim 5 wherein the metallic bench mark means comprise a plurality of metallic bench marks.

9. A system according to claim 8 wherein said plurality of metallic bench marks comprises several non-continuous metallic bench mark sections.

10. A guidance system for guiding at least one unmanned trackless work-producing vehicle, the system comprising:
at least one unmanned trackless vehicle;
metallic bench mark means;
magnetic field generating means carried on the vehicle;
means carried on the vehicle detecting said magnetic field and a second magnetic field associated with the metallic bench mark means and discriminating the second magnetic field from any magnetic field associated with a non-bench mark metallic object adjacent to the vehicle;
means carried on the vehicle producing a voltage, the magnitude of which is dependant on the relative location of the metallic bench mark means and the vehicle;
means in electrical communication with the voltage producing means evaluating said voltage; and
control means in electrical communication with the discriminating means and the evaluating means receiving and analyzing the evaluated voltage and controlling the displacement of the vehicle based on said analysis.

11. A system according to claim 10 wherein the discriminating voltage producing means comprise means located asymmetrically across a boundary between areas of opposite magnetic fields produced by said magnetic field generating means.

12. A system according to claim 10 wherein said magnetic field generating means further comprise:
means producing an alternating current;
coil means in electrical communication with said alternating current producing means converting said alternating current into a magnetic field.

13. A system according to claim 10 wherein the voltage producing means further comprise a plurality of spaced voltage producing means.

14. A system according to claim 13 wherein the sampling means comprise means identifying a maximum voltage for each of the spaced voltage producing means, and wherein the control means comprise means in electrical communication with said identifying means comparing said maximum voltages, and means in electrical communication with said comparing means determining the location of said metallic bench mark means with respect to the said spaced voltage producing means.

15. A system according to claim 14 wherein the metallic bench mark means further comprise a non-ferromagnetic material and wherein the control means comprise means in electrical communication with the identifying means and the comparing means discriminating between the non-ferromagnetic bench mark means and ferromagnetic materials.

16. A system according to claim 15 wherein said non-ferromagnetic bench mark means comprise an aluminum material.

17. A system according to claim 14 wherein the metallic bench mark means comprise a plurality of metallic bench marks.

18. A system according to claim 17 wherein said plurality of metallic bench marks comprises several non-continuous metallic bench mark sections.

19. A method for steering a trackless unmanned work-producing vehicle along a path comprising;
   producing a first varying magnetic field at the vehicle;
   using said first magnetic field to coil-produce a first electric current at the vehicle;
   using said first magnetic field to create a second varying magnetic field about a metallic bench mark adjacent to the vehicle;
   using said second magnetic field to coil-produce a second electric current at the vehicle;
   creating and measuring a plurality of vector sums of the said first and second voltages to determine the maximum observed amplitude of said vector sums;
   transducing said vector sums into vehicle steering commands; and
   causing the trackless vehicle to be steered in accordance with said steering commands.

20. A method according to claim 19 wherein the step of coil-producing a second electric current comprises inducing electric currents in a plurality of coils.

21. A method according to 19 wherein the transducing step comprises:
   comparing the maximum observed amplitude of voltage for each of a plurality of coils;
   determining the location of the trackless unmanned vehicle with reference to said maximum of observed values; and
   producing corresponding steering commands for said trackless, unmanned vehicles.

22. A method according to claim 19 wherein the second using step comprises creating a second varying magnetic field about a non-ferromagnetic bench mark strip by direct action of said first magnetic field.

23. A method according to claim 19 wherein the second using step comprises creating a second varying magnetic field about a metallic bench mark, said second varying magnetic field being more than 180° out of phase with said first magnetic field.

24. A method for steering a trackless vehicle along a predetermined path comprising;
   producing a first varying magnetic field at the vehicle;
   inducing at the vehicle a first coil-produced electric current, by direct use of said first magnetic field;
   creating a second varying magnetic field about a metallic bench mark adjacent to the vehicle, by direct use of said first magnetic filed;
   inducing at the vehicle a second coil-produced electric current, by action of said second magnetic field;
   creating and measuring a plurality of vector sums of the said first and second voltages to determine the maximum observed amplitude of said vector sums;
   eliminating all voltages except those produced by said first and second magnetic fields thereby identifying the metallic bench mark with certainty as being a part of the predetermined vehicle path;
   transducing said vector sums into steering commands; and
   steering a trackless vehicle in accordance with said steering commands.

25. A method of guiding at least one unmanned trackless work-producing vehicle comprising:
   generating a plurality of magnetic fields in respect to at least one unmanned trackless work-producing vehicle, selectively including one magnetic field around non-vehicle site-defining metallic objects of predetermined characteristics;
   producing a series of successive composite voltage at the vehicle proportional to the plurality of magnetic fields;
   periodically samplings said composite voltages;
   analyzing each sampled composite voltage;
   discriminating between the site-defining metallic objects and other metallic objects having different characteristics; and
   controlling the displacement of the vehicle based on said analysis.

26. A method of guiding at least one unmanned trackless work-producing vehicle comprising:
   generating a first magnetic field from at least one unmanned trackless vehicle;
   creating a second magnetic field in association with a metallic bench mark spaced from the vehicle;
   detecting said first magnetic field and the second magnetic field associated;
   discriminating the second magnetic from any magnetic field associated with a non-bench mark metallic object adjacent to the vehicle;
   producing a voltage, the magnitude of which is dependant on the relative location of the metallic bench mark and the vehicle;
   evaluating said voltage;
   analyzing the evaluated voltage; and
   controlling the displacement of the vehicle based on said analysis.

* * * * *